United States Patent
Griffin et al.

(10) Patent No.: US 9,654,993 B1
(45) Date of Patent: May 16, 2017

(54) GESTURE BASED NOTIFICATION TUNING FOR COLLABORATION SYSTEMS

(71) Applicant: Cisco Technology, Inc., San Jose, CA (US)

(72) Inventors: Keith Griffin, Oranmore (IE); Patrick Connor Linskey, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/920,582

(22) Filed: Oct. 22, 2015

(51) Int. Cl.
*H04M 3/00* (2006.01)
*H04B 1/38* (2015.01)
*H04W 24/02* (2009.01)
*H04M 3/537* (2006.01)

(52) U.S. Cl.
CPC ........... *H04W 24/02* (2013.01); *H04M 3/537* (2013.01)

(58) Field of Classification Search
CPC .............................. H04W 24/08; H04W 4/008
USPC ......... 455/418, 566, 574, 419, 414.2, 456.1, 455/456.3; 386/201, 248, 107, 227
See application file for complete search history.

(56) References Cited

U.S. PATENT DOCUMENTS

| | | | |
|---|---|---|---|
| 8,264,518 B2 | 9/2012 | Khouri et al. | |
| 8,687,848 B2 | 4/2014 | Bran et al. | |
| 8,817,061 B2 | 8/2014 | Shaffer et al. | |
| 2007/0037610 A1* | 2/2007 | Logan | H04M 1/72563 455/574 |
| 2009/0239587 A1* | 9/2009 | Negron | G06F 3/04883 455/566 |
| 2015/0019715 A1* | 1/2015 | Ronen | H04W 4/003 709/224 |
| 2015/0110259 A1* | 4/2015 | Kaye | H04M 3/56 379/202.01 |

OTHER PUBLICATIONS

"Disable Vibration on iPhone When Placed on a Flat Surface: MyVibe Cydia Tweak." (Feb. 28, 2013). Retrieved from http://maypalo.com/2013/02/28/disable-vibration-iphone-myvibe/.
"How to set up and use Do Not Disturb mode on iPhone and iPad." (Apr. 22, 2014). Retrieved from http://www.imore.com/how-to-setup-use-do-not-disturb-iphone-ipad.
"Semantics Takes Presence Beyond State in Unified Communications." (Mar. 28, 2011). Retrieved from http://www.dataversity.net/semantics-takes-presence-beyond-state-in-unified-communications/.
Qin, Yujue, et al. "A context-aware do-not-disturb service for mobile devices." Proceedings of the 13th International Conference on Mobile and Ubiquitous Multimedia. ACM, (Nov. 25, 2014).

* cited by examiner

*Primary Examiner* — Kiet Doan
(74) *Attorney, Agent, or Firm* — Lempia Summerfield Katz LLC

(57) ABSTRACT

A mobile device or a server may be configured to automatically define a customized mute status. Data indicative of a physical movement of the mobile device is received. In response, the mobile device is monitored to determine whether one or more notifications are received at the mobile device and whether a responsive action responsive to the one or more notifications is taken at the mobile device. When no responsive action is taken, a customized mute status for the mobile device is defined or stored.

13 Claims, 13 Drawing Sheets

| X | Y | Z | A | B | C | Time |
|---|---|---|---|---|---|------|
|   |   |   |   |   |   |      |

GESTURE BASED NOTIFICATION TUNING FOR COLLABORATION SYSTEMS

TECHNICAL FIELD

This disclosure relates in general to the field of collaboration systems, and more particularly, to gesture based notification control for a mobile device of a collaboration system.

BACKGROUND

Some phone networks of traditional phones (e.g., "land lines") on the plain old telephone system (POTS) were equipped with a "make me busy" function. Users could dial a code (e.g., *72), which causes all incoming callers to receive a busy signal.

Similar functionality was translated to mobile phones. Users may silence a phone to turn off the phone ringer and/or direct incoming calls directly to voicemail. Other systems have corresponding controls. Instant messaging systems have away messages (e.g., "busy" or "away from desk") that informs other users that a particular person cannot be reached by instant message. Email systems have out-of-office or automatic reply messages to inform the senders of incoming emails that the particular user will not have email access for a time period. Integrated communication and presence systems may have "busy" or "busy on the phone" status messages.

However, any of these notifications are only as effective as the users who implement them. Users forget to silence devices at the movie theater, in meetings, and other similar situations. No solutions exist for silencing mobile devices automatically in appropriate situations.

BRIEF DESCRIPTION OF THE DRAWINGS

Exemplary embodiments of the present embodiments are described herein with reference to the following drawings.

DESCRIPTION OF EXAMPLE EMBODIMENTS

Overview

Figure 1:
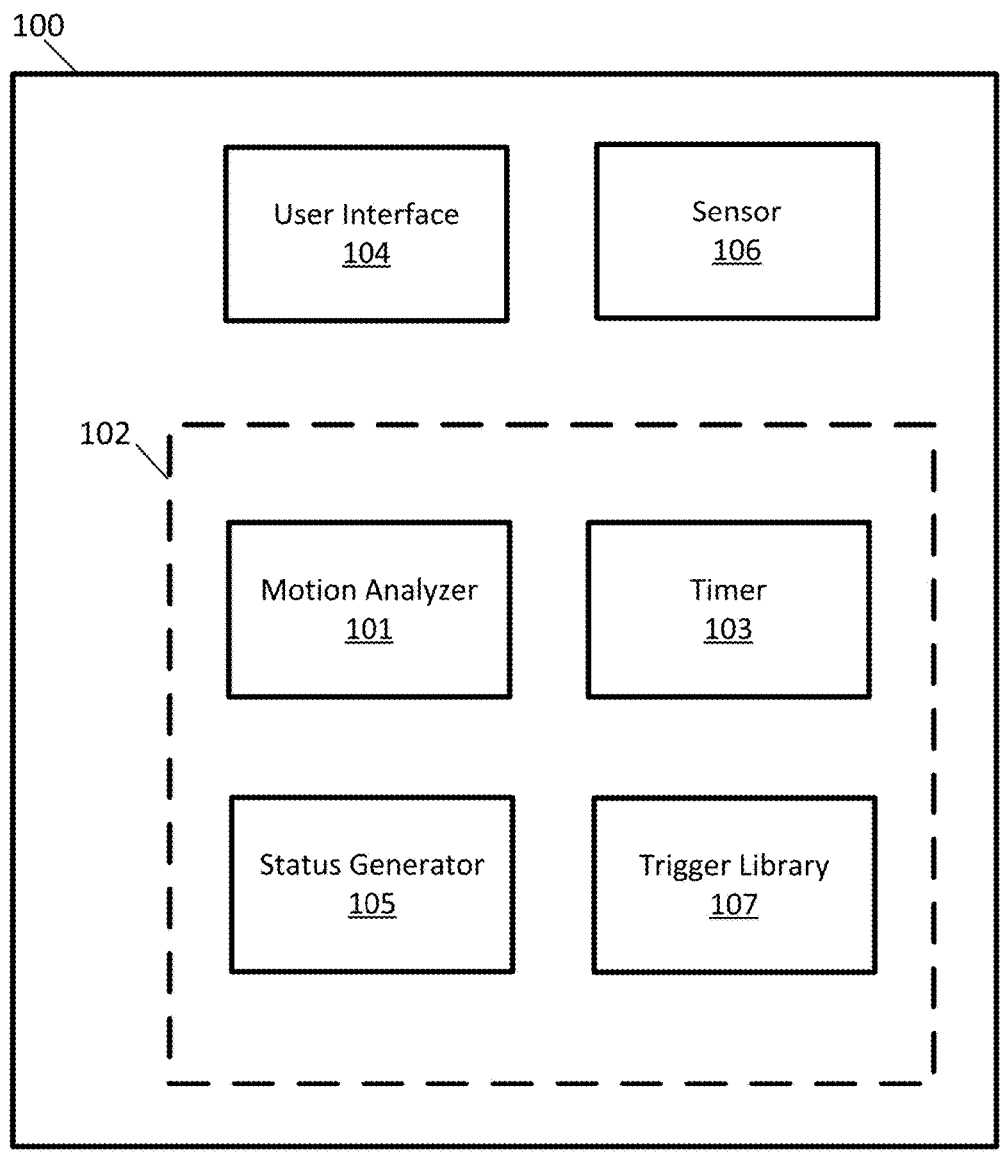
FIG. 1 illustrates an example mobile device for gesture based notification tuning or silencing.

In an embodiment, a method includes receiving data indicative of a physical movement of a mobile device, starting a timer in response to the physical movement of the mobile device, and monitoring the mobile device until the timer reaches a predetermined time limit. It is determined whether one or more notifications are received at the mobile device and whether a responsive action responsive to the one or more notifications is taken at the mobile device. In response to the timer reaching the predetermined time limit without the responsive action, a customized mute status for the mobile device is defined.

In one embodiment, an apparatus comprises a processor and a memory comprising one or more instructions executable by the processor to perform receiving data indicative of a motion of a mobile device, monitoring the mobile device in response to the motion of the mobile device, determining whether one or more incoming communications are received at the mobile device, and performing a determination of whether a response to the one or more incoming communications is made at the mobile device. In response to the determination of whether the response to the one or more incoming communications is made at the mobile device, a mute status trigger for the mobile device is defined.

Example Embodiments

A collaboration system allows users to share messages, documents, or other information in order to collaborate in a common goal. One type of collaboration system is a communication system in which users can communicate through a variety of formats and/or a variety of devices using the same username or identity. For example, users may communicate with smartphones, laptops, tablet, desktop computers, and/or other devices using any combination of formats, including phone calls, text messages, instant messages, video conferencing, voice over internet protocol (VoIP), meeting invites, collaboration messages (e.g., whiteboard content) and/or others. Collaboration systems may send notifications to mobile and desktop devices in response to communication attempts from other users. For example, a device may ring, vibrate, beep, or display a visual alert. The notifications are useful for attracting attention, but can be inappropriate in some situations when attention should be directed elsewhere. Users are not successful in consistently turning off notifications in these scenarios.

This following embodiments addresses this issue by automatically allowing the user to signal to a collaboration system that it should not present any alerts for some time. The signal comes through the user's natural behavior rather than from a specific command. This principle is first described with a hypothetical example.

Consider a collaboration system that enables Alice and Bob to communicate with Charlie. When Bob sends an asynchronous message to Alice, the collaboration system notifies Alice by causing one or more of Alice's devices (e.g., mobile phone, tablet, and/or laptop) vibrate, play a sound, or provide another type of alert. Meanwhile, when Bob calls Alice or initiates a group meeting involving Alice and Charlie, the collaboration system notifies the targets of the synchronous communication request via the same alert mechanisms. This can lead to undesirable notifications, in which Alice's device interrupts Alice in situations when Alice prefers to focus on something else. For example, if Alice is in a meeting, she does not want her phone to ring or vibrate in her pocket or on the desk because the noise is a distraction from the meeting.

Today, Alice's easiest tool to disable these alerts is to put her device into do-not-disturb (DND) mode. This is not ideal since it takes a few steps to perform, requires Alice to focus her attention on her device as she performs them (which can be socially unacceptable), and also prevents high-priority notifications from coming through. Additionally, relying on the device's DND mode is too coarsely grained. That is, by using this approach, Alice is forced to silence all other applications running on her device.

The following embodiments improve on this system by providing Alice a tool to easily indicate to the collaboration system that she does not want to receive audible or tactile alerts for all or certain notification types possibly based on a policy engine. In one example, notifications for group messages are blocked, but notifications for incoming calls are passed through as normal. Alice can indicate this by placing her phone face down on a flat surface such as a table. Not only does this signal the DND mode, this type of gesture provides a social cue to others in the meeting that she is not focused on her phone. The gesture is also detectable by existing sensors on the phone. If that condition is met, the application can then mute alerts for inbound notifications.

FIG. 1 illustrates an example mobile device 100 for gesture based notification tuning or silencing. The mobile device 100 includes a controller 102, a user interface 104, and at least one sensor 106. The controller 102 may include circuitry, instructions, modules, or logic representative of a motion analyzer 101, a timer 103, a status generator 105, and a trigger library 107. Addition, different, or fewer components may be included.

The at least one sensor 106 may be a sensor array including any combination of a global positioning system (GPS), one or more accelerometers, a magnetic sensor, a gyroscope, an inertial measurement unit, a proximity sensor, a motion sensor or another sensor. The sensor 106 may be any type of position sensor generating position data. The sensor 106 is configured to detect a physical movement of a mobile device. In one example, the sensor 106 is a multi-axis (e.g., three axis) accelerometer (e.g., position sensor) that generates accelerometer data (e.g., position data) indicative of the acceleration forces on the mobile device 100 in each of the axes.

The motion analyzer 101 may receive the accelerometer data, or other sensor data, describing the physical movement of the mobile device 100. The motion analyzer 101 determining whether a gesture or a particular set of gestures has occurred. When the accelerometer data presents a particular pattern, the motion analyzer 101 identifies the gesture. The pattern of accelerometer data may be indicative of turning the mobile device 100 over, sliding the mobile device 100 across a table, sliding the mobile device 100 into a pocket or a holder, or another predetermined movement. In one example, the pattern of accelerometer data may be any movement indicative of a placement of the mobile device in an unusable orientation.

The pattern may indicate that the mobile device 100 rotates a predetermined angle. The pattern may indicate that the mobile device 100 translates a predetermined distance. The pattern may be a combination of one or more rotations and one or more translations. The pattern may be a series of one or more rotations and one or more translations.

In response to the motion analyzer 101 identifying the physical movement of the gesture, the timer 103 starts to count time or decrement time. The timer 103 counts time until a predetermined time limit is reached. Example predetermined time limits includes 5 minutes, 20 minutes, an hour, or another time period. While the timer 103 is counting, the status generator 105 monitors the user's interaction with the mobile device 100 until the timer 103 reaches the predetermined time limit.

The mobile device 100 is monitored to determine whether one or more notifications are received at the mobile device 101. The notifications may be phone calls, text messages, instant messages, video conferencing, voice over internet protocol (VoIP) communications, and/or others.

The status generator 105 determines whether a responsive action responsive to the one or more notifications is taken at the mobile device 100. The responsive action may be picking up the mobile device 100 to acknowledge the notification. The responsive action may be a responsive communication (e.g., including phone calls, text messages, instant messages, video conferencing, or voice over internet protocol (VoIP)) made using the user interface 104 in response to the notifications. The responsive action may be a keypress of a home key or a power key to illuminate the user interface 104 in order to read the notifications.

When the timer reaches the predetermined time limit without the responsive action, the status generator 105 defines a customized mute status or a trigger for a customized mute status for the mobile device 100. The customized mute status is stored in the trigger library 107. The customized mute status may be the physical movement or pattern that corresponded to the user not responding to the one or more notifications. In other words, when the physical movement of the mobile device 100 is followed by an absence of responsive action in response to notification, the physical movement is stored in the trigger library 107.

Subsequently, when the mobile device 100 is subjected to the same physical movement again, the status generator 105 identifies the pattern and automatically places the mobile device 100 in a DND mode or mute status. Returning the example above, Alice places her phone face down on a flat surface such as a table. This movement has previously been associated with a customized mute status in the trigger library 107. In response to the phone being placed on the table, the corresponding customized mute status is identified from the trigger library 107, and accordingly, Alice's phone is placed in the mode associated with the customized mute status.

The trigger library 107 may associate various physical movements with various modes. The mute or do not disturb modes may be of varying degrees. For example, a voice mute may only mute voice call notification, a media mute may mute only video conference notifications and voice call notifications, a message mute may mute text messages and instant messages. Other combinations are possible. Different motion patterns may be associated with different types of muting modes or do not disturb modes. For any customized mute status, the user may configure the types of notifications that are muted.

The trigger library 107 may also categorize the customized mute statuses according to day of the week or time of day. In one example, the trigger library 107 is only written to or access during an operable time range, such as business hours (e.g., between 8 A.M. and 5 P.M. local time and Monday through Friday). In other words, the initial operation of controller 102 may be to determine whether a current time is within an operable time range. The operable time range may be configurable by a user. That is a user may set an operable time range that the motion analyzer 101 analyses motion and identifies movement patterns, and the timer 103 and status generator 105 identifies when the movement patterns precede a period that the user ignores notifications.

In one example, the pattern for the gesture detected by the motion analyzer 101 is any amount of movement following by a stationary period. In other words, the motion analyzer 101 continually measured the motion of the mobile device 100. When motion ends, the timer 103 counts time until the predetermined time limit is reached. In this example, the timer 103 resets to zero when new motion is detected by the motion analyzer 101. While the timer 103 is counting, the status generator 105 monitors the mobile device 100 to determine is one or more notifications are received but no responsive action is taken by the mobile device 100, signifying that the user is busy and ignoring notifications.

Figure 2:
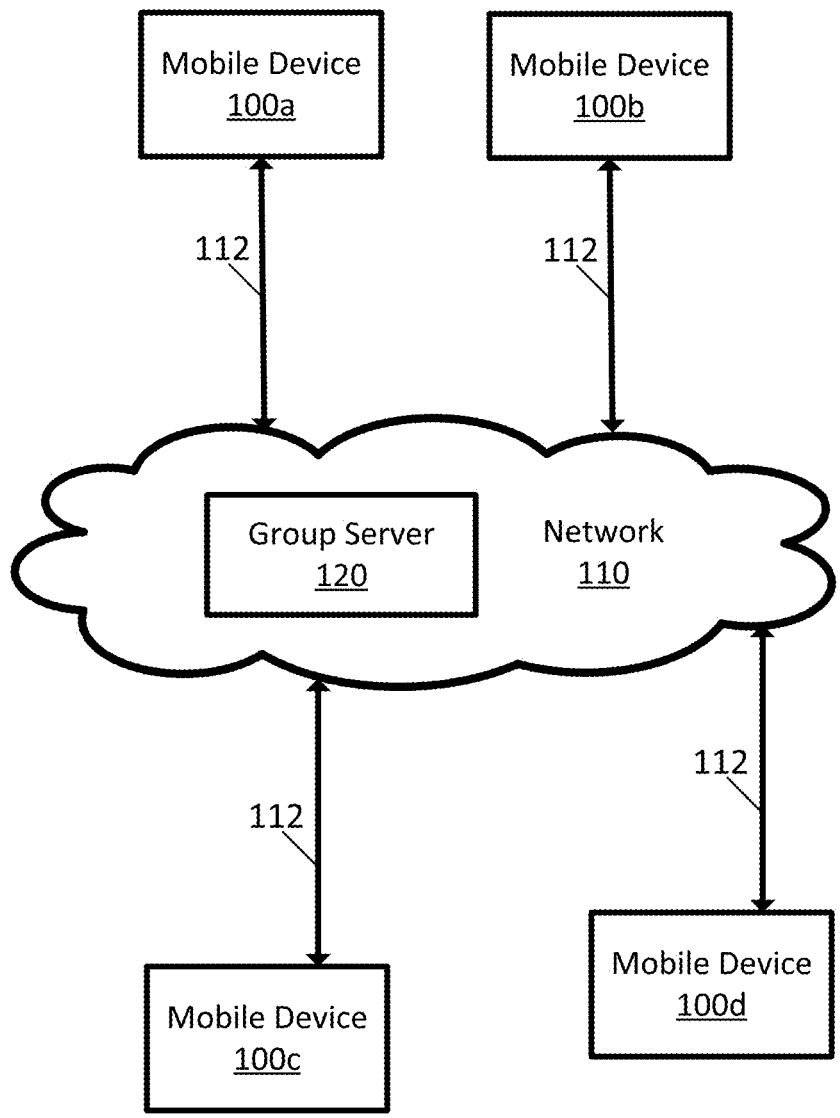
FIG. 2 illustrates an example system for crowd defined gesture based notification tuning or silencing.

FIG. 2 illustrates an example system for crowd defined gesture based notification tuning or silencing. The system includes a network 110 coupled with a group server 120 and multiple mobile devices 100a-d using communication paths 112. While four mobile devices are illustrated, any number of mobile devices may be included. The network 110 may include any combination of network devices including, router, gateways, switches, or other devices configured for sending data packets between the group server 120 and the mobile devices 100a-d. Additional, different, or fewer devices may be included.

The group server 120 may receive sensor data from one or more of the mobile device 100a-d. For example, the sensor (e.g., any combination of a global positioning system (GPS), one or more accelerometers, a magnetic sensor, a gyroscope, an inertial measurement unit, or another sensor) generates data describing the movement of the respective mobile device.

The group sever 120 may aggregate the sensor data from multiple mobile devices. For example, the group server 120 determine whether a gesture or a particular set of gestures has occurred during any of the sensor data from the mobile device 100a-d. When the sensor data presents a particular pattern, the group server 120 identifies the gesture. The pattern of accelerometer data may be indicative of turning the mobile device over, sliding the mobile device across a table, sliding the mobile device into a pocket or a holder, or another predetermined movement. The group server 120 may monitor movement of all of the mobile devices and identify when any of the mobile devices performs a predetermined movement.

In response to identifying the physical movement of the gesture, the group server 120 may being to count time up or down until zero or a predetermined time is reached. The group server 120 monitors operations of the mobile devices 100a-d. When one of the predetermined movements is followed by the same mobile device receiving a notification and the user of that mobile device not responding, the group server 120 creates a customized mute status or a trigger for a customized mute status.

The trigger for the customized mute status is stored in memory. The trigger for the customized mute status derived from the movement and operation of one mobile device (e.g., mobile device 100a) may be applied to all of the mobile devices (e.g., mobile devices 100a-d). In this way the operation of the mobile devices are crowd sources to create the customized mute statuses that can be applied to all users or a subset of users.

The triggers for the customized mute status may be associated with different groups of users. For example, a particular company may apply the customized mute status to all devices registered with or connected with the company's network. Similarly, a family may configure their devices to have the same customized mute status. Thus, the group server 120 may include a lookup table to associate various mute status triggers with different groups of users.

The group server 120 monitors subsequent movements of one or more mobile devices 100a-d to identify when any of the mobile devices performs a similar movement. In response, the group server 120 automatically places the respective mobile device 100 in the customized mute status.

Figures 3A, 3B:
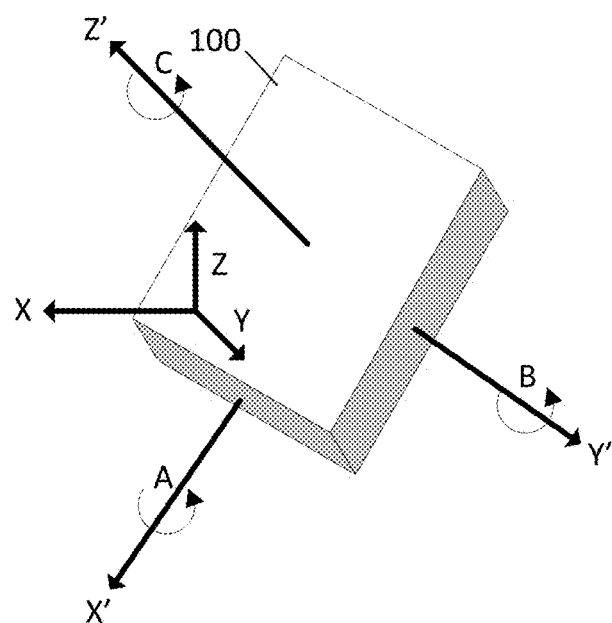
FIG. 3A illustrates an example translational coordinate system and rotational coordinate system for the mobile device.
FIG. 3B illustrates an example activity log for movements of the mobile device.

FIG. 3A illustrates an example translational coordinate system and rotational coordinate system for the mobile device 100. The sensor data or accelerometer data described herein may be generated by a three accelerometers or a three axis accelerometers. The three axis accelerometer may be combined in a single package but measure acceleration in three directions. A first accelerometer measures acceleration in the X direction, another accelerometer measures acceleration in the Y direction, and another accelerometer measures acceleration in the Z axis. The accelerometer data may be processed to identify an orientation of the mobile device described by (X', Y', Z'). The accelerometer data may be processed to identify a rotation of the mobile device, including one or more of angle A about axis X or current acceleration vector X', angle B about axis Y or current acceleration vector Y', or angle C about axis Z or current acceleration vector Z'. Alternatively or in addition, similar positions, accelerations, or rotations may be derived from a gyroscope and/or a magnetic sensor.

FIG. 3B illustrates an example activity log 130 for movements of the mobile device 100. The activity log 130 may be generator by motion analyzer 101 or group server 120 in order to track and monitor the movements of the mobile device 100. The activity log 130 may store positions X, Y, and Z, and rotations A, B, C and predetermined time intervals (e.g., sampling intervals). The motion analyzer 101 or the group server 120 may store raw data in an activity log 130 and examine the raw data over time in order to identify the predetermined patterns of movement described herein. In addition, the triggers for subsequently triggering the customized mute status may be identified through storing raw data in an activity log 130 and identifying the raw data over time.

Figure 4:
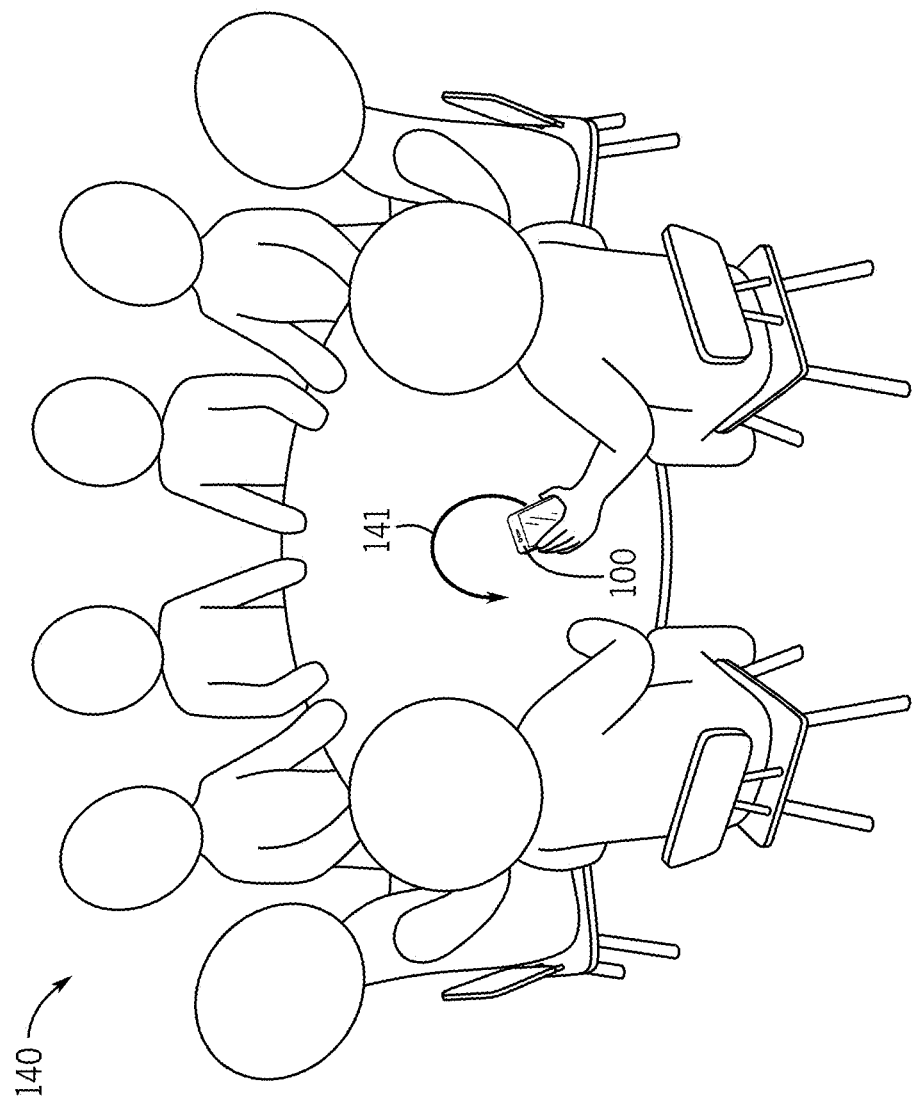
FIG. 4 illustrates an example gesture for the mobile device in a meeting scenario.

FIGS. 4-7 illustrate examples of gestures that could be predetermined patterns that cause customized mute statuses to be identified. FIG. 4 illustrates an example gesture for the mobile device 100 in a meeting scenario 140. The mobile device 140 has been turned over on the table, as shown by dotted line 141. The dotted line 141 corresponds to a predetermined pattern that the motion analyzer 101 or the group server 120 may identify in order to monitor subsequent notification and response behavior. The dotted line 141 may also correspond to movement that is subsequently a trigger for activating the customized mute pattern.

Figure 5:
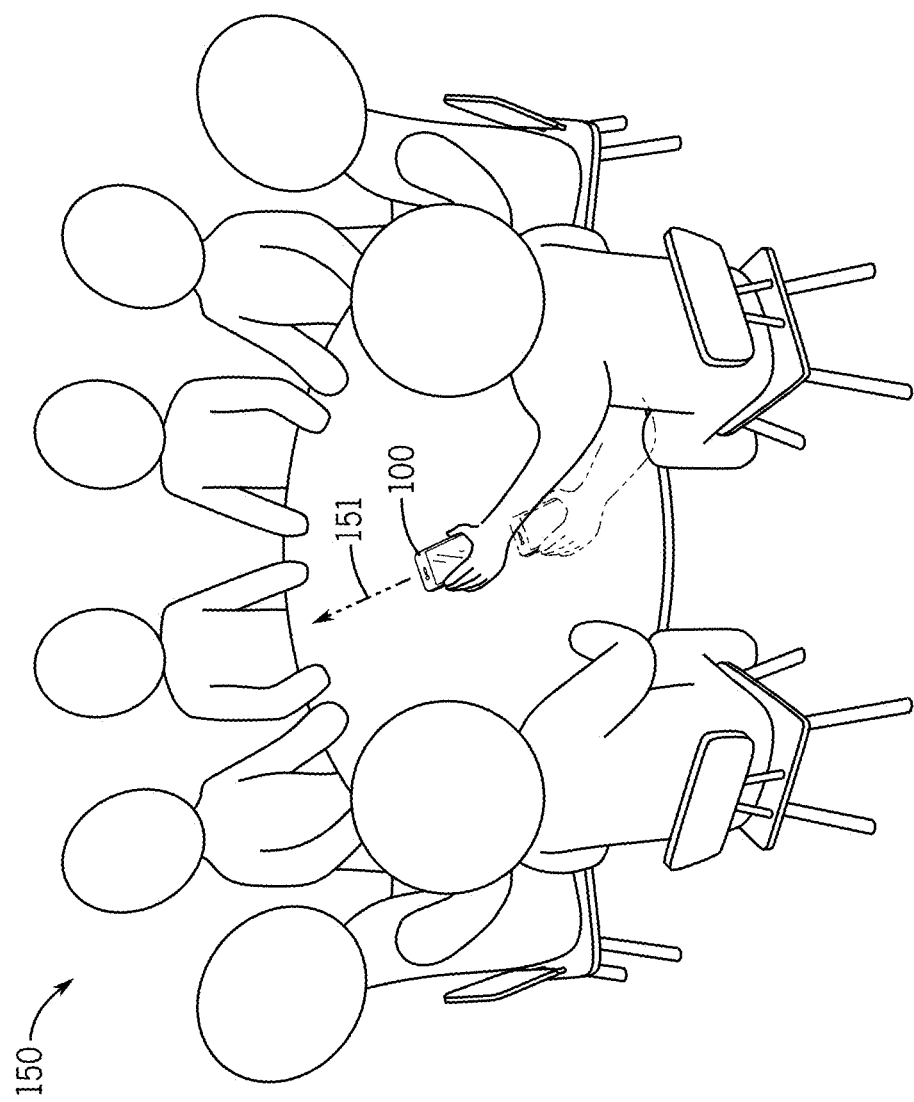
FIG. 5 illustrates an example gesture for the mobile device in a meeting scenario.

FIG. 5 illustrates an example gesture for the mobile device 100 in a meeting scenario 150. The mobile device 10 has been slid across the table, as shown by dotted line 151. The dotted line 151 corresponds to a predetermined pattern that the motion analyzer 101 or the group server 120 may identify in order to monitor subsequent notification and response behavior. The dotted line 151 may also correspond to movement that is subsequently a trigger for activating the customized mute pattern.

Figure 6:
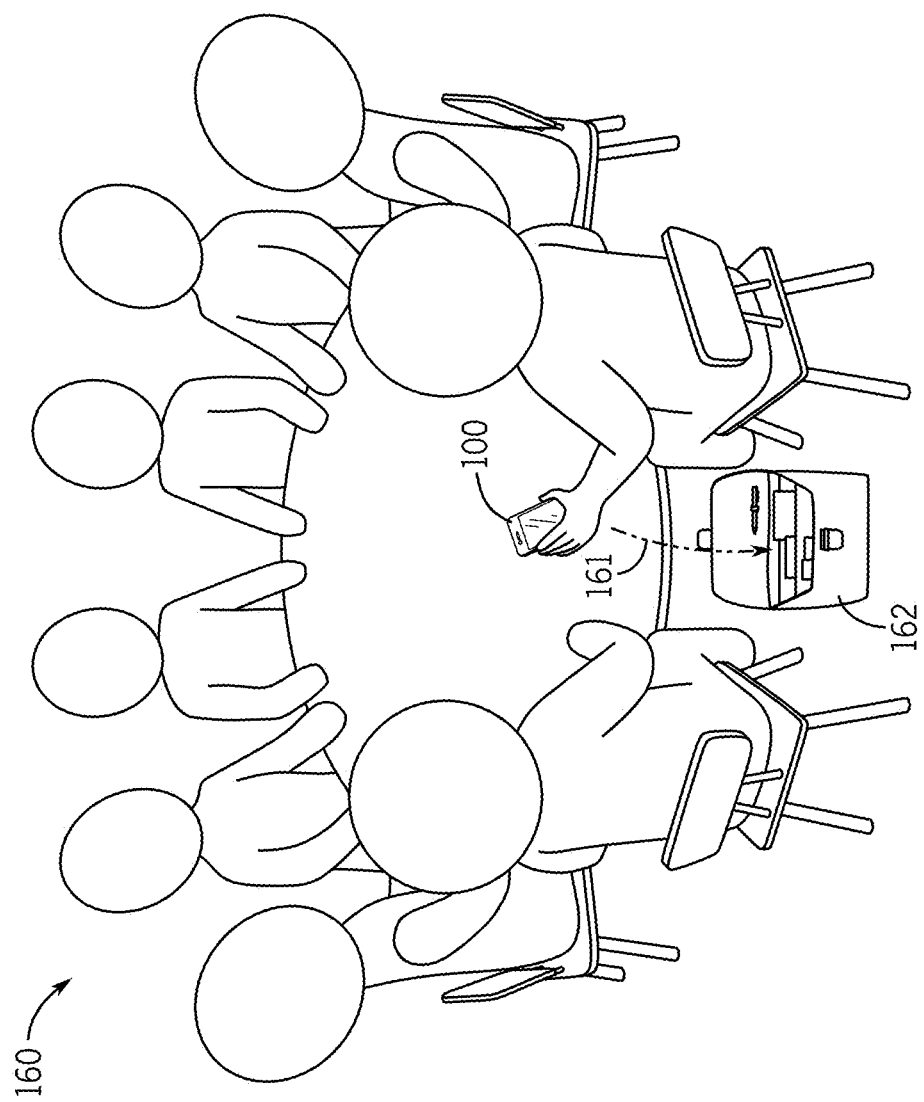
FIG. 6 illustrates an example gesture for the mobile device in a meeting scenario.

FIG. 6 illustrates an example gesture for the mobile device 100 in a meeting scenario 160. The mobile device 100 has been placed in bag 162, as shown by dotted line 161. The bag 162 represents a laptop case, a suitcase, a purse, or a backpack. Similarly, the mobile device 100 may be placed in a pocket. The dotted line 161 corresponds to a predetermined pattern that the motion analyzer 101 or the group server 120 may identify in order to monitor subsequent notification and response behavior. The dotted line 161 may also correspond to movement that is subsequently a trigger for activating the customized mute pattern.

Figure 7:
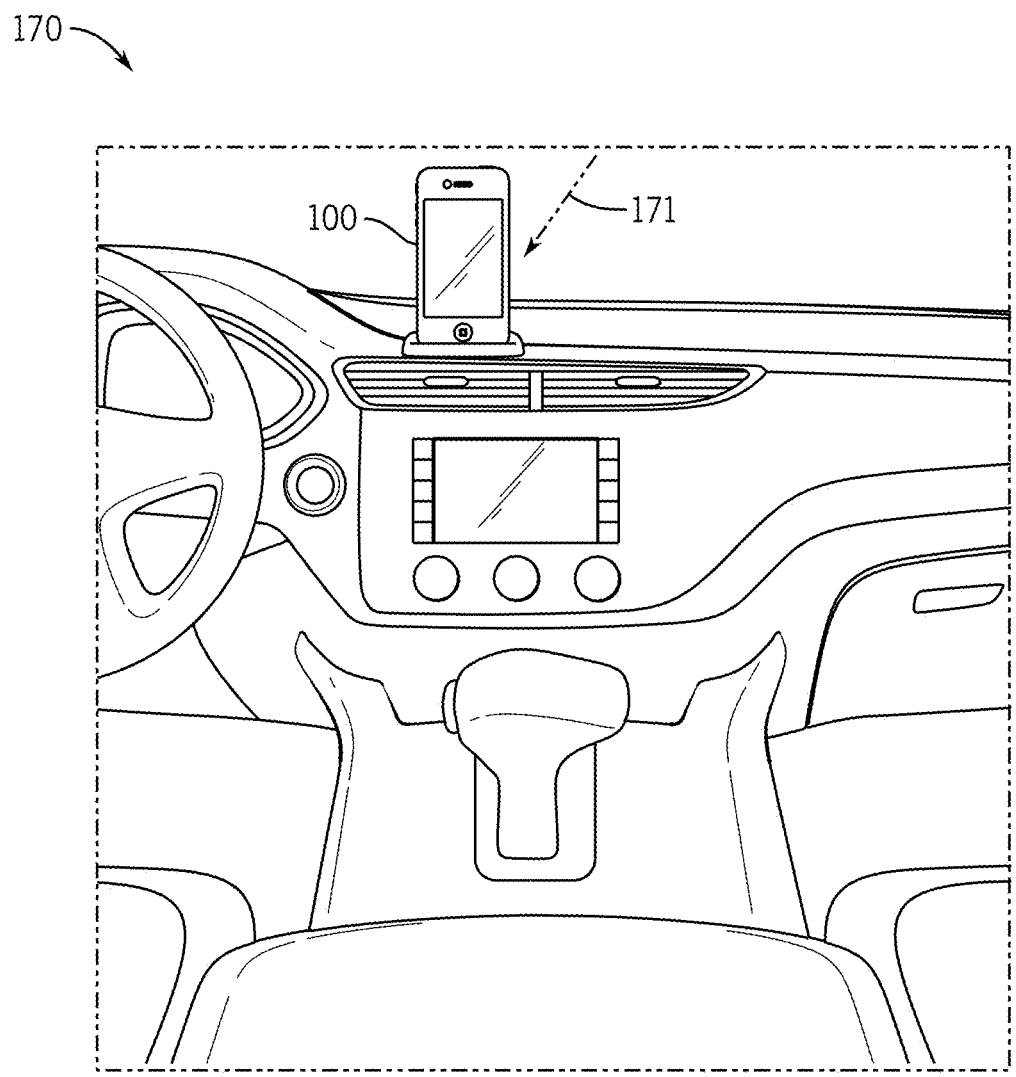
FIG. 7 illustrates an example activity for the mobile device in a driving scenario.

FIG. 7 illustrates an example activity for the mobile device in a driving scenario 170. The mobile device 100 has been mounted on a dashboard, or placed in a predetermined position, as shown by dotted line 171. The dotted line 171 corresponds to a predetermined pattern that the motion analyzer 101 or the group server 120 may identify in order to monitor subsequent notification and response behavior. The dotted line 171 may also correspond to movement that is subsequently a trigger for activating the customized mute pattern.

Figure 8:
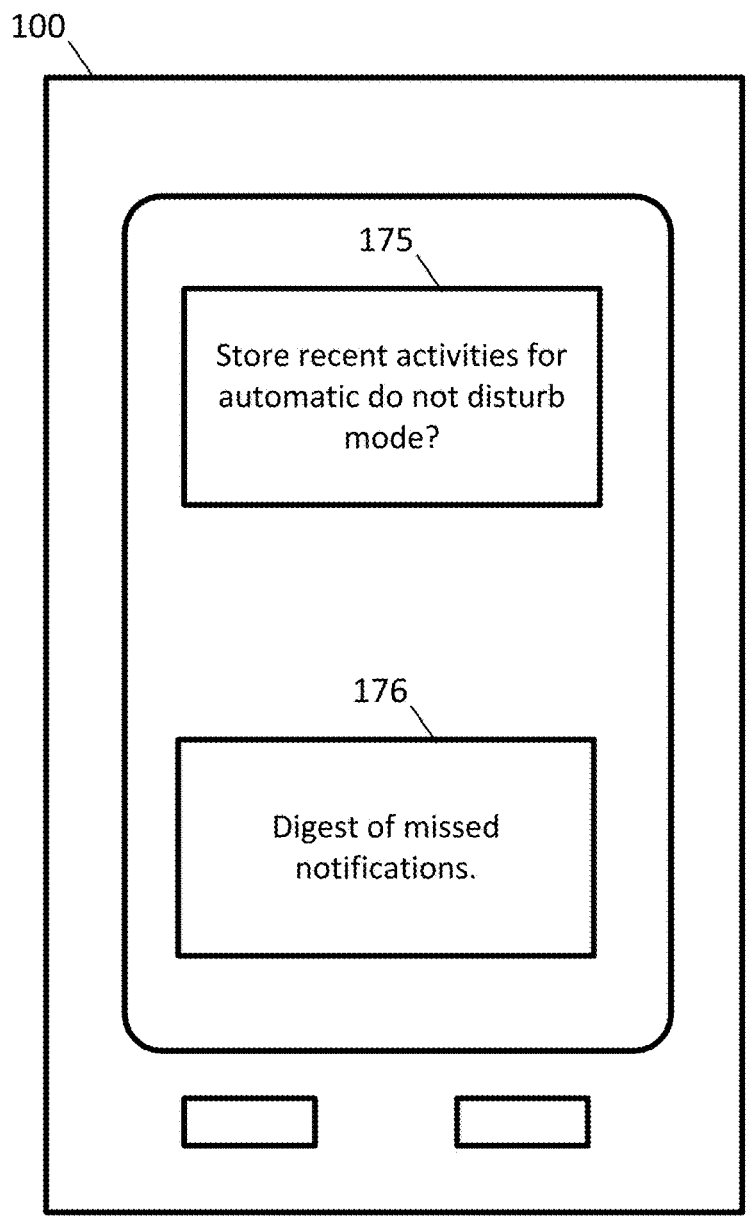
FIG. 8 illustrates an example notification message for gesture based notification tuning or silencing.

FIG. 8 illustrates an example mobile device 100. The mobile device 100 may display a digest 176 and/or notification message 175 for gesture based notification tuning or silencing. The notification message 175 and the digest 176 are illustrated together but may be displayed at different times or the same time.

After the status generator 105 or the group server 120 has identified a time when notifications have been received but no response was made by the user, the mobile device may generate the notification message 175. The notification message 175 may inform the user that it was detected that the user was ignoring the mobile device 100. The notification message 175 may ask the user whether the previous activity should be recorded to automatically put the mobile device in a do not disturb mode. An example notification message 175 may be "We noticed you were away. Should the device be automatically muted in similar situations in the future?" In addition or in the alternative a digest prompt may be included in the notification message 175. An example for the digest prompt may be "Select for a digest of missed notifications." The digest 176 may be presented automatically.

The digest 176 may describe the notifications that were received in the user's absence. The digest 176 may list the notifications by types (e.g., any combination of text messages, calls, meeting notification, collaboration notifications, and instant messages). The list of missed messages is presented to the user allowing them to quickly catch back up. The digest 176 may be contextually generated as it is possible that simply seeing all missed notifications could be overwhelming in a high message volume application. A contextual update will help the user differentiate among what they have missed during DND and noisy conversations.

In one example, a contextual awareness and behavior module may receive multiple sensor inputs from multiple devices for a given user. The role of this module is twofold. It maintains awareness of the user's context (this could be semantic presence for example) and, the module learns the user behavior for the gestures identified herein. For example, when the user slides the mobile device on a table facing downwards while in a meeting and does not interact with the phone during the meeting on a continual basis. When the user next uses the phone this behavioral context is verified with the user that DND should be implemented when this gesture is detected next time around, as such the system may learn and tune itself with user input. It could also take a granular approach to suppress some types of notifications (e.g. text conversation) while allowing others to notify the user of (e.g. a voice/video call).

As described previously, when the user next interacts with the device they receive the digest 175 of notifications based on contextual priority. The digest 175 may contain relevant information only, telling the user what they missed and bringing the user back into the application where they can also discover other (lower priority) items that have been missed. In other words, the digest 175 may prioritize important items based on context and user behavior.

The digest 175 and the notification 176 may combined. An example combined message may be "We think you were busy because your phone was face-down. While you were busy, we got 5 new messages from your contexts." The combined message may include two or more options such as (1) [Thanks!] and (2) [I wasn't away!].

Figure 9:
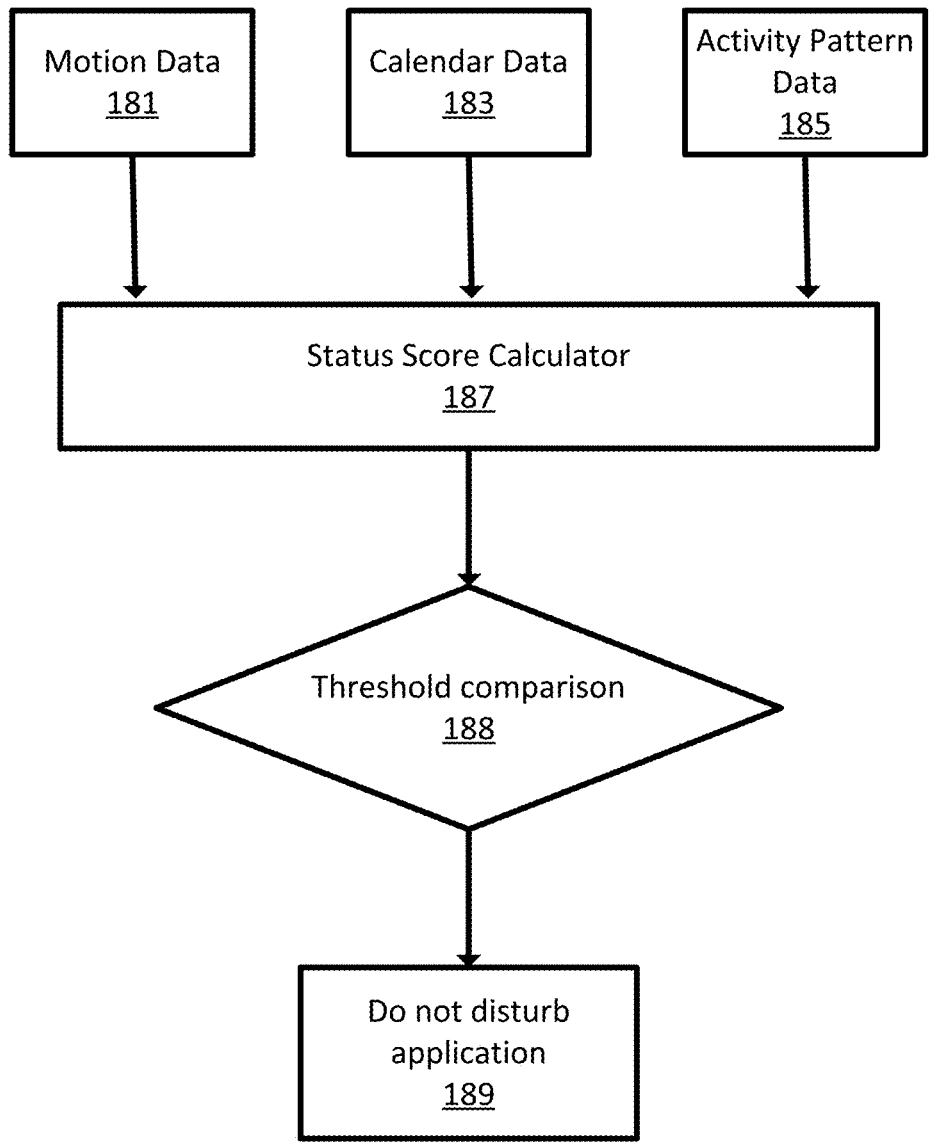
FIG. 9 illustrates an example block diagram for applying silencing or do not disturb mode.

FIG. 9 illustrates an example block diagram for applying silencing or do not disturb mode 189. The sequence of the block diagram may be performed by the controller 102 or the group server 120. The block diagram includes motion data 181, calendar data 183, an activity pattern data 185, status score calculator 187, a threshold comparison 188, and a do not disturb mode 189. Additional, different or fewer elements may be included in the block diagram.

The motion data 181 includes inertial measurement unit (IMU) or accelerometer data that describes the motion of the mobile device 100. The calendar data 183 describes appointments, meetings, or other activity patterns of the mobile device 100. The calendar data 100 may include individual calendared events (e.g., meeting X at 8 A.M. on September 1) or repeating meetings (e.g., staff meeting from 9 A.M. to 10 A.M. on weekdays). The calendar data 100 may describe when the user in typically working. The activity pattern data 185 may describe activities of the mobile device 100 independent of the calendar. For example, activity pattern data 185 may reflect that the user is normally in a car commuting at a certain time. Similarly, the activity pattern data 185 may reflect that the user is normally in a meeting at a certain time. The activity pattern data 185 may be generated based on the user's activity pattern with the mobile device 100 (i.e., the user does not send out communications or respond to notifications during particular time period such as while commuting or while in staff meetings).

The status score calculator 187 may combine the motion data 181, calendar data 183, and activity pattern data 185 to calculate a status score. The status score may be modified based on a ringer status (e.g., whether or not the ringer is disabled, the volume of the ringer, or whether or not vibrate notification is activated) of the mobile device. The status score defines whether or not the mobile device should be in a DND mode. In some instances, motion that strongly suggests that the user is not responsive results in the DND mode. In other instances, motion that normally would not constitute the DND mode, is coupled with calendar data that indicates the user is likely busy, and results in the DND mode. Similarly, more subtle suggestions by the motion data 181, the calendar data 183, and the activity pattern data 185, occurring at the same time may result in the DND mode.

In other words, the status score is compares to a threshold at threshold comparison 188. The status score allows components (motion data 181, calendar data 183, and activity pattern data 185) to individually cause the DND mode to be activated or collectively cause the DND mode to be activated. When the status score exceeds the threshold, the DND mode 189 is activated.

Figure 10:
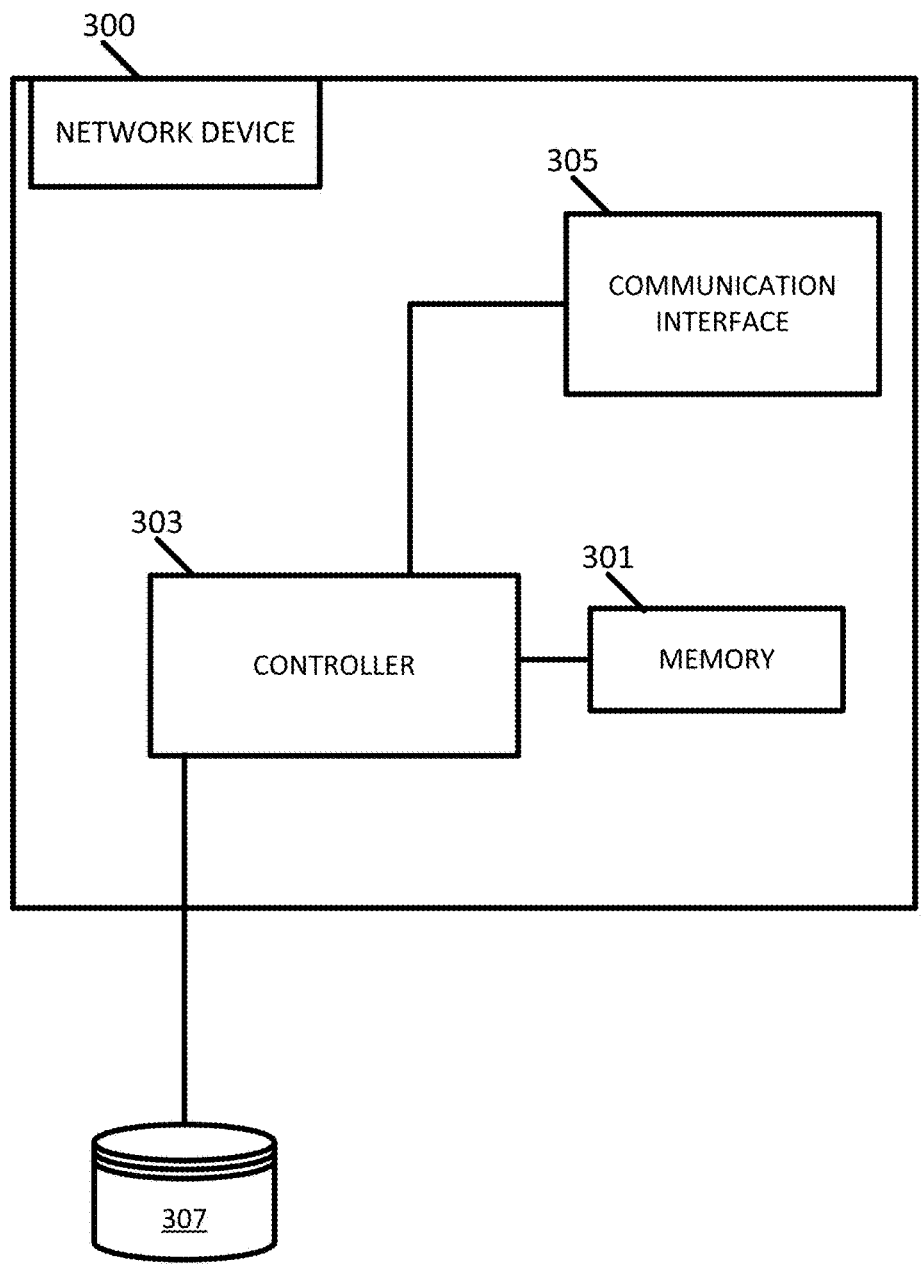
FIG. 10 illustrates an example network device for the gesture based notification tuning or silencing.

FIG. 10 illustrates an example computing network device 300 for the gesture based notification tuning or silencing. The computing network device includes at least a memory 301, a controller 303, and a communication interface 305. Additional, different, or fewer components may be provided. Different network devices may have the same or different arrangement of components.

Figure 11:
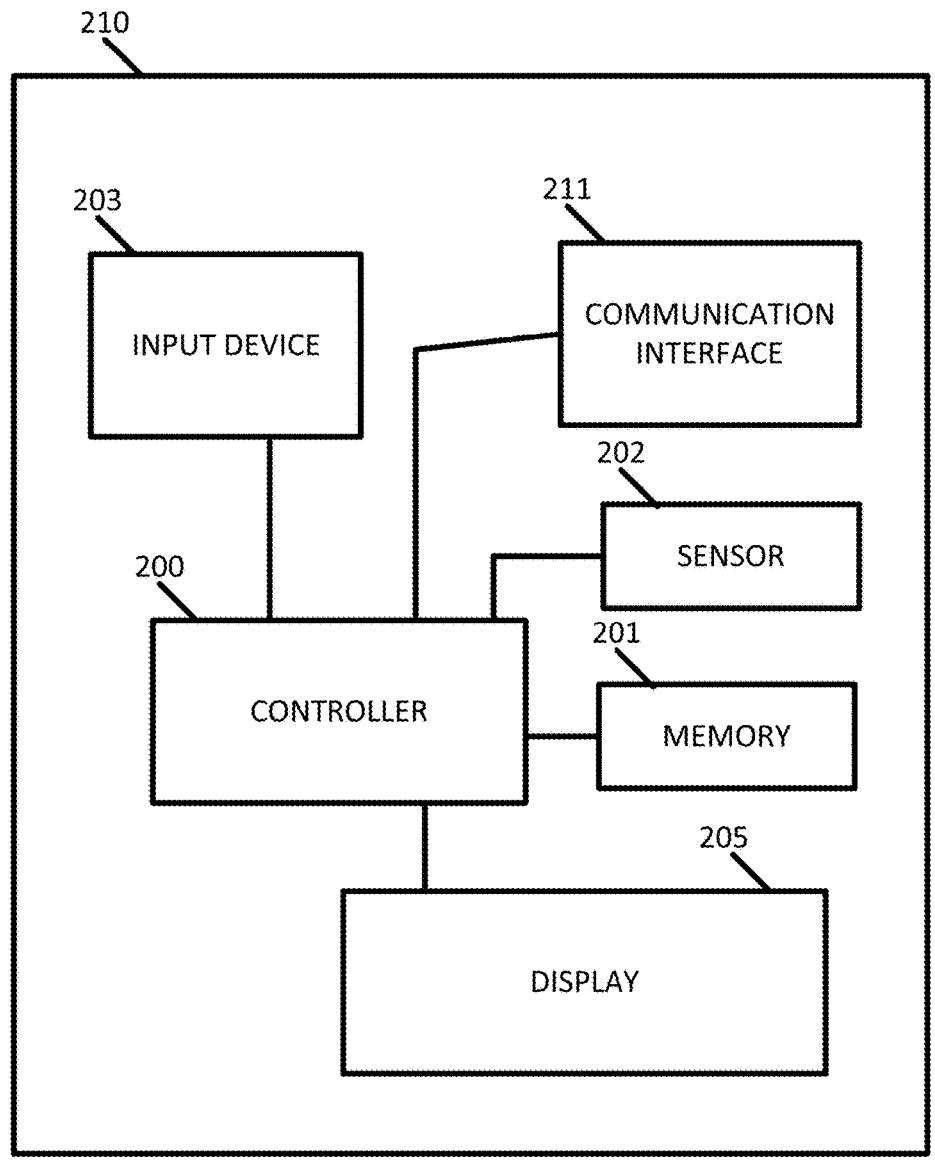
FIG. 11 illustrates an example endpoint device for gesture based notification tuning or silencing.

FIG. 11 illustrates an example computing endpoint device 210 for gesture based notification tuning or silencing. The computing endpoint device 210 may include a controller 200, a memory 201, a sensor 202, an input device 203, a communication interface 211 and a display 205. Additional, different, or fewer components may be provided. Different network devices may have the same or different arrangement of components.

Figure 12:
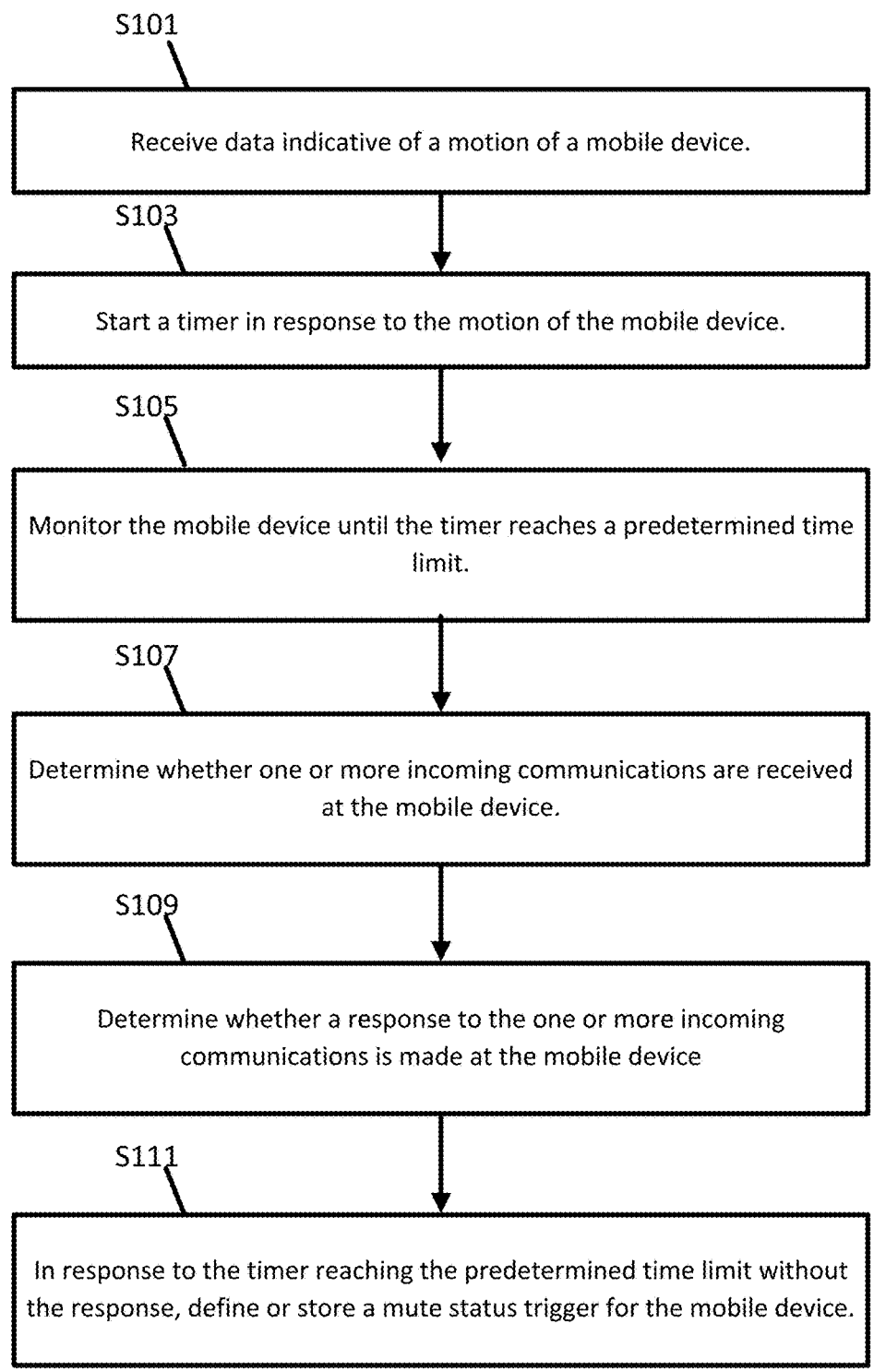
FIG. 12 illustrates an example flowchart for gesture based notification tuning or silencing using the network device of FIG. 10.

FIG. 12 illustrates an example flowchart for gesture based notification tuning or silencing using the network device of FIG. 10. Additional, different, or fewer acts may be provided. The acts are performed in the order shown or other orders. The acts may also be repeated.

At act S101, the controller 303 or the communication interface 305 receives data indicative of a motion of the computing endpoint device 210. The data indicative of motion (motion data) may be generated by a mobile device and transmitted to the communication interface 305 through a network, such as any combination of a cellular network, a local area network, or the Internet.

At act S103, the controller 303 starts a timer in response to the motion of the computing endpoint device 210. At act S105, the controller 303 monitors the mobile device until the timer reaches a predetermined time limit. The predetermined time limit may be a minimum amount of time for determining when a user is unavailable. Example predetermined time limits may be 5, 10 or 30 minutes.

At act S107, the controller 303 determines whether one or more incoming communications are received at the communication interface 305 of the computing endpoint device 210. The incoming communication may be any messages received from another user or from another device.

At act S109, the controller 303 determines whether a response to the one or more incoming communications is made at the computing endpoint device 210. The responsive may be an outgoing communication from the endpoint device 210 that is monitored by the controller 303. The controller 303 may monitor whether the endpoint device 210 sends a short message service message, places a phone call, or sends any data through the network.

At act S111, the controller 303, in response to the timer reaching the predetermined time limit without the response, defining a mute status trigger for the computing endpoint device 210. The mute status trigger may be defined according to the motion data that the endpoint device 210 experienced before the incoming communication and subsequent absence of a response. The motion data may correspond to a pattern that shows that the endpoint device 210 was turned over onto a surface based on the orientation of the endpoint device 210, correspond to a pattern that shows that the endpoint device 210 is moved across a surface, or correspond to a pattern that shows that the endpoint device 210 is placed in a pocket, cup holder, bag, or windshield mount.

Subsequently, if the endpoint device 210 experiences a similar pattern of subsequent motion, the controller 303 may automatically perform a comparison the subsequent motion to the motion pattern for the mute status trigger. When there is a match or a substantial match, the controller 303 may activate a do not disturb status based on the comparison.

Figure 13:
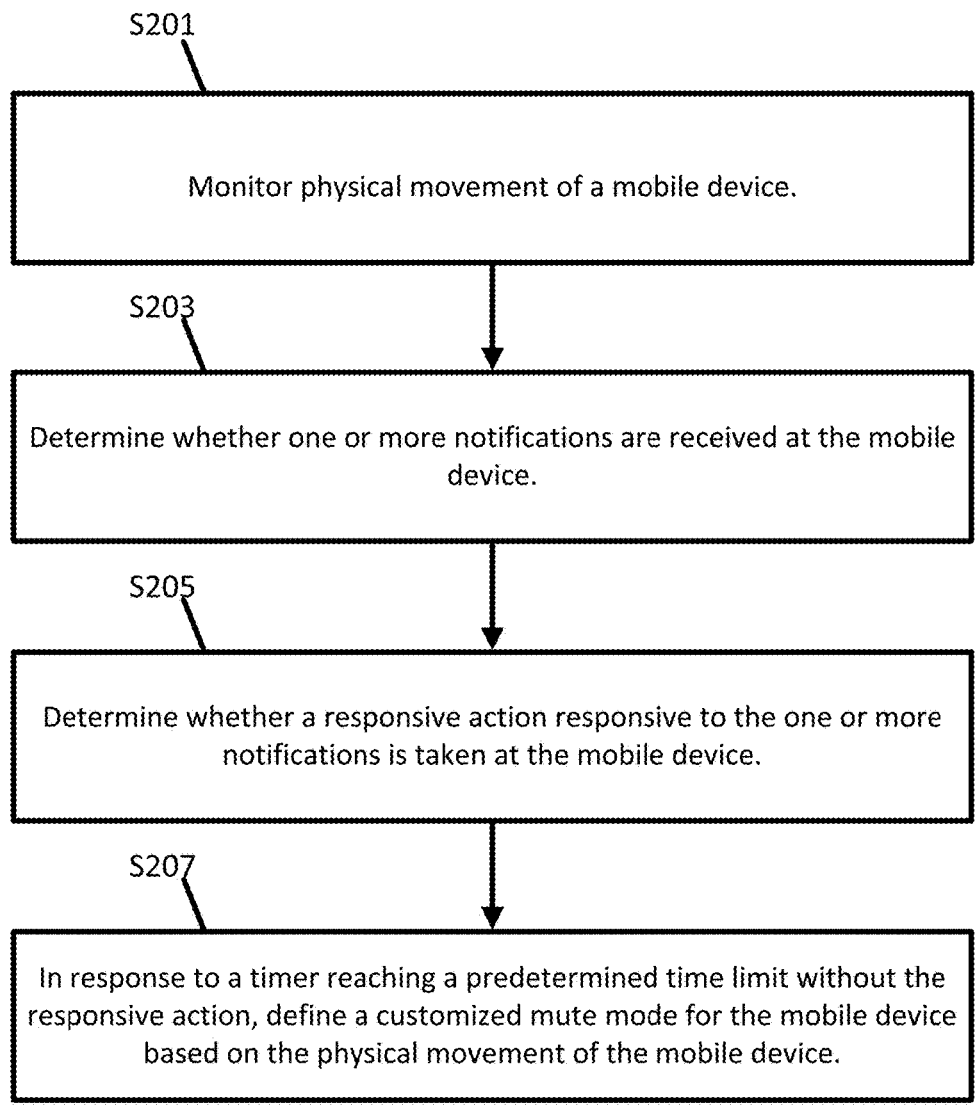
FIG. 13 illustrates an example flowchart gesture based notification tuning or silencing using the endpoint device of FIG. 11.

FIG. 13 illustrates an example flowchart gesture based notification tuning or silencing using the endpoint device of FIG. 11. Additional, different, or fewer acts may be provided. The acts are performed in the order shown or other orders. The acts may also be repeated.

At act S201, the input device 203 or controller 200 receives sensor data from a sensor 202, which may be a single sensor or a sensor array including any combination of accelerometers, magnetic sensors, and gyroscopes. The sensor data may be preprocessed. For example, the sensor data may be sampled at a relatively low rate sufficient to describe basic movements of the endpoint device 210. The sensor data may be filtered to remove outliers and noise. In addition, the sensor data may be combined from a variety of sources and processed such that the data describes the basic movement of the endpoint device 210.

At act S203, the controller 200 monitors physical movement of a mobile device. The controller 200 stored data indicative of the motion over time in the memory 201. At act S205, the controller 200 determines whether one or more notifications are received at the mobile device. At act S205, the controller 200 determines whether a responsive action responsive to the one or more notifications is taken at the endpoint device. In one example, the controller 200 identifies whether a responsive action takes place only by determining whether the display 205 is turned on. In another example, the controller 200 monitors transmissions by communication interface 211 do determine whether any responses (e.g., messages, calls, or any data) were sent.

At act S207, in response to a timer reaching a predetermined time limit without the responsive action, the controller 200 defines a customized mute mode or a trigger for the customized mute mode for the endpoint device 210 based on the physical movement of the endpoint device 210. In other words, once a notification has been received but no responsive action have been taken, the controller 200 accesses memory 201 to determine what movements led up to this situation. Those movements are associated with the customized mute mode or a trigger for the customized mute mode.

Subsequently, when the controller 200 encounters similar movements, the controller 200 may automatically place the endpoint device 210 in the customized mute mode. For example, the controller 200 may monitor subsequent motion of the endpoint device 210. The controller 200 may perform a comparison the subsequent motion to the physical movement corresponding to the customized mute mode that is stored in memory 201. The controller 200 then activate the customized mute mode in response to the comparison.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The input device 203 may be one or more buttons, keypad, keyboard, mouse, stylist pen, trackball, rocker switch, touch pad, voice recognition circuit, or other device or component for inputting data to the endpoint 103. The input device 203 and the display 205 may be combined as a touch screen, which may be capacitive or resistive. The display 205 may be a liquid crystal display (LCD) panel, light emitting diode (LED) screen, thin film transistor screen, or another type of display.

The controllers 200 and 303 may include a general processor, digital signal processor, an application specific integrated circuit (ASIC), field programmable gate array (FPGA), analog 130 circuit, digital circuit, combinations thereof, or other now known or later developed processor. The controller 303 may be a single device or combinations of devices, such as associated with a network, distributed processing, or cloud computing.

The memories 201 and 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 103, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The memories 201 and 301 are non-transitory computer-readable media, which may be a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving data indicative of a physical movement of a mobile device;
   receiving accelerometer data collected by the mobile device;
   identifying the physical movement from the accelerometer data for the mobile device, wherein identifying the physical movement comprises comparing the position data to one or more predetermined patterns;
   starting a timer in response to the physical movement of the mobile device;
   monitoring the mobile device until the timer reaches a predetermined time limit;
   determining whether one or more notifications are received at the mobile device;
   determining whether a responsive action responsive to the one or more notifications is taken at the mobile device; and
   in response to the timer reaching the predetermined time limit without the responsive action, defining a customized mute status for the mobile device,
   wherein the responsive action is an outgoing communication responsive to the one or more notifications, or the responsive action is an input to the mobile device responsive to the one or more notifications.

2. The method of claim 1, wherein the physical movement corresponds to placement of the mobile device in an unusable orientation.

3. The method of claim 1, wherein the physical movement corresponds to turning the mobile device over on a surface.

4. The method of claim 1, wherein the one or more notifications includes a message, a call, or a meeting notification.

5. The method of claim 1, further comprising:
   storing the customized mute status for the mobile device in memory;
   detecting a subsequent physical movement of the mobile device;

performing a comparison of the subsequent physical movement to the physical movement for the customized mute state; and activating the customized mute state based on the comparison.

6. The method of claim 1, further comprising:

receiving calendar data;

receiving activity data; and calculating a status score based on data indicative of the physical movement of the mobile device and the calendar data or the activity data.

7. The method of claim 6, further comprising;

comparing the status score to a threshold, wherein the customized mute status is activated when the status score exceeds the threshold.

8. An apparatus comprising:

a processor; and a memory comprising one or more instructions executable by the processor to perform:

receiving data indicative of a motion of a mobile device;

monitoring the mobile device in response to the motion of the mobile device;

determining whether one or more incoming communications are received at the mobile device;

performing a determination of whether a response to the one or more incoming communications is made at the mobile device;

in response to the determination of whether the response to the one or more incoming communications is made at the mobile device, defining a mute status trigger for the mobile device;

storing the mute status trigger for the mobile device in memory;

detecting a subsequent motion of the mobile device;

performing a comparison of the subsequent motion to the mute status trigger; and activating a do not disturb status based on the comparison, wherein the motion is described by accelerometer data collected by the mobile device and the accelerometer data is compared to one or more patterns.

9. The apparatus of claim 8, wherein the motion corresponds to placement of the mobile device in an unusable orientation.

10. The apparatus of claim 8, wherein the motion corresponds to turning the mobile device over on a surface.

11. The apparatus of claim 8, wherein the one or more incoming communications includes a message, a call, or a meeting notification.

12. A non-transitory computer readable medium including instructions that when executed are configured to cause a processor to:

monitor physical movement of a mobile device;

determine whether one or more notifications are received at the mobile device;

perform a determination of whether an action is taken at the mobile device, wherein the determination further comprises a classification of the action as responsive to the one or more notifications or as not responsive to the one or more notifications;

in response to the determination of no responsive action responsive to the one or more notifications is taken at the mobile device, defining a customized mute mode for the mobile device based on the physical movement of the mobile device;

monitor subsequent motion of the mobile device;

perform a comparison the subsequent motion to the physical movement corresponding to the customized mute mode; and activate the customized mute mode based on the comparison.

13. The non-transitory computer readable medium of claim 12, wherein the one or more notifications include a text message, an instant message, a call, or a meeting notification.

* * * * *